US012670225B2

(12) United States Patent
Senn et al.

(10) Patent No.: US 12,670,225 B2
(45) Date of Patent: Jun. 30, 2026

(54) FUZZY CACHE ARCHITECTURE FOR SERVING CONTENT ITEMS

(71) Applicant: Google LLC, Mountain View, CA (US)

(72) Inventors: Kevin Alexander Senn, Victoria (CA); Fong Fang Shen, Los Altos, CA (US); Ehsan Maani, Monte Sereno, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/655,802

(22) Filed: May 6, 2024

(65) Prior Publication Data

US 2025/0342219 A1 Nov. 6, 2025

(51) Int. Cl.
G06F 16/90 (2019.01)
G06F 16/954 (2019.01)
G06F 16/957 (2019.01)

(52) U.S. Cl.
CPC ........ G06F 16/9574 (2019.01); G06F 16/954 (2019.01)

(58) Field of Classification Search
CPC .......................... G06F 16/9574; G06F 16/954
See application file for complete search history.

(56) References Cited

U.S. PATENT DOCUMENTS

| | | | |
|---|---|---|---|
| 9,753,964 B1 * | 9/2017 | Marshall | .......... G06F 18/24137 |
| 10,424,034 B1 * | 9/2019 | Wang | .................. G06F 21/6263 |
| 11,132,721 B1 * | 9/2021 | Uthaman | .............. G06F 16/955 |
| 11,921,990 B2 | 3/2024 | Seeley et al. | |
| 2002/0083151 A1 * | 6/2002 | Adams | ................ G06F 16/9574 |
| | | | 709/215 |
| 2006/0265552 A1 | 11/2006 | Davis et al. | |
| 2024/0078417 A1 | 3/2024 | Temam et al. | |
| 2024/0320251 A1 * | 9/2024 | Hemington | ........... G06F 16/338 |

* cited by examiner

*Primary Examiner* — Kristopher Andersen
(74) *Attorney, Agent, or Firm* — DORITY & MANNING P.A.

(57) ABSTRACT

Techniques for retrieving and presenting content items using a fuzzy cache are presented herein. A computing system can include a fuzzy cache having a plurality of cluster identifiers. Each cluster identifier in the plurality of cluster identifiers can have a result associated with a previously executed request. Additionally, the computing system can include a first machine-learned model configured to generate a vector embedding, and a second machine-learned model configured to generate a cluster identifier. Moreover, the system can receive, from a user device, a first request having a first feature. Furthermore, the system can process, using the first machine-learned model, the request to generate a first vector embedding associated with the first request. Subsequently, the system can process, using the second machine-learned model, the first vector embedding to determine a first cluster identifier. The system can retrieve, from the fuzzy cache, a first result on the first cluster identifier.

19 Claims, 7 Drawing Sheets

500

502 RECEIVE, FROM A USER DEVICE, A FIRST REQUEST HAVING A FIRST FEATURE

504 PROCESS, USING THE FIRST MACHINE-LEARNED MODEL, THE REQUEST TO GENERATE A FIRST VECTOR EMBEDDING ASSOCIATED WITH THE FIRST REQUEST

506 PROCESS, USING THE SECOND MACHINE-LEARNED MODEL, THE FIRST VECTOR EMBEDDING TO DETERMINE A FIRST CLUSTER IDENTIFIER

508 RETRIEVE, FROM THE FUZZY CACHE, A FIRST RESULT ON THE FIRST CLUSTER IDENTIFIER

CONTENT ITEM SERVING SYSTEM 200

DATA COLLECTION LAYER 210

DATA PROCESSING AND ANALYSIS LAYER 220

TARGETING COMPONENT 230

CONTENT INVENTORY MANAGEMENT COMPONENT 240

CACHE MANAGEMENT COMPONENT 250

CONTENT SERVING COMPONENT 260

MONITORING COMPONENT 270

INTEGRATION COMPONENT 280

400

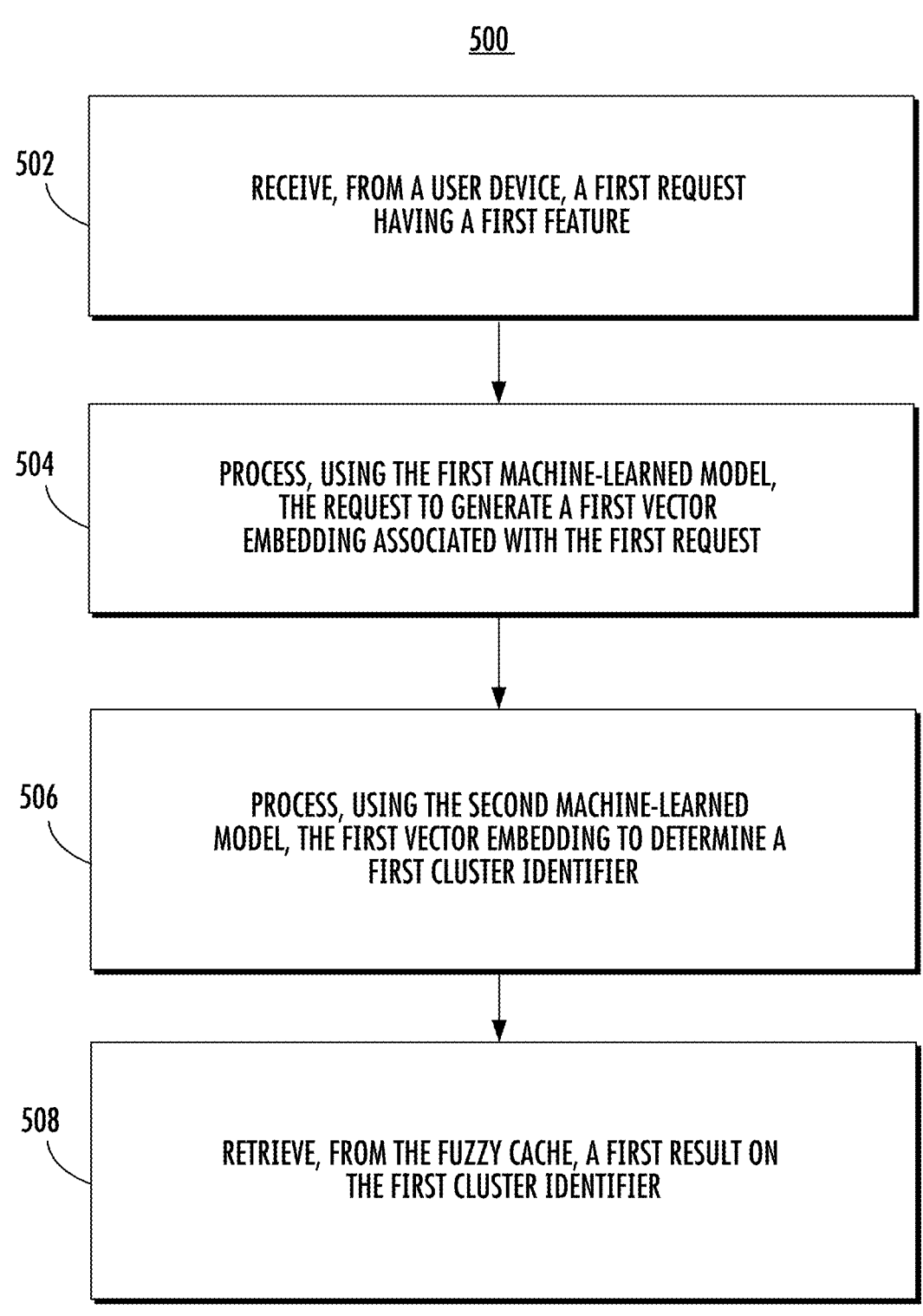

500

502  RECEIVE, FROM A USER DEVICE, A FIRST REQUEST
HAVING A FIRST FEATURE

504  PROCESS, USING THE FIRST MACHINE-LEARNED MODEL,
THE REQUEST TO GENERATE A FIRST VECTOR
EMBEDDING ASSOCIATED WITH THE FIRST REQUEST

506  PROCESS, USING THE SECOND MACHINE-LEARNED
MODEL, THE FIRST VECTOR EMBEDDING TO DETERMINE A
FIRST CLUSTER IDENTIFIER

508  RETRIEVE, FROM THE FUZZY CACHE, A FIRST RESULT ON
THE FIRST CLUSTER IDENTIFIER

FIG. 5

FUZZY CACHE ARCHITECTURE FOR SERVING CONTENT ITEMS

FIELD

The present disclosure relates generally to serving content items using a fuzzy cache architecture. More particularly, the present disclosure relates to techniques for utilizing a fuzzy cache to enable low latency serving of content items.

BACKGROUND

In a content serving system, a cache is used to store various components related to serving content items and targeting information to improve the efficiency and speed of content delivery. For example, content items (e.g., images, videos, or HTML5 files) can be cached to reduce latency in serving content to users. When a content item request is received, the system can quickly retrieve the pre-cached content item from the cache instead of fetching it from a remote server, which can significantly reduce the time required to load the content item. Additionally, information related to content item targeting, such as user profiles, demographics, interests, and contextual data, can be cached to facilitate rapid decision-making during content item selection. By storing targeting information in the cache, the content item serving system can quickly identify relevant content items for each user without needing to query additional services. Overall, caching plays a crucial role in optimizing the performance, scalability, and reliability of content serving systems by reducing latency, minimizing external dependencies, and improving the overall user experience with faster content delivery.

SUMMARY

Aspects and advantages of embodiments of the present disclosure will be set forth in part in the following description, or can be learned from the description, or can be learned through practice of the embodiments.

One example aspect of the present disclosure is directed to a computing system for serving content items using a fuzzy cache. The computing system can include one or more processors and one or more non-transitory computer-readable media. The computer-readable media can collectively store a fuzzy cache, a first machine-learned model, and second machine-learned model. The fuzzy cache can include a plurality of cluster identifiers, where each cluster identifier in the plurality of cluster identifiers includes a result associated with a previously executed request. The first machine-learned model can be configured to generate a vector embedding. The second machine-learned model can be configured to generate a cluster identifier. The computer-readable media can further include instructions that, when executed by the one or more processors, cause the computing system to perform operations. The operations can include receiving, from a user device, a first request having a first feature. Additionally, the operations can include processing, using the first machine-learned model, the request to generate a first vector embedding associated with the first request. Moreover, the operations can include processing, using the second machine-learned model, the first vector embedding to determine a first cluster identifier. Furthermore, the operations can include retrieving, from the fuzzy cache, a first result on the first cluster identifier.

In some instances, the first result is associated with queries that are similar to the first query.

In some instances, the first feature is based on user information associated with a user of the user device.

In some instances, the first request includes a second feature that is based on browsing information of the user device.

In some instances, the first machine-learned model processes the first feature and the second feature to generate the first vector embedding.

In some instances, the second machine-learned model determines the first cluster identifier by using a nearest-neighbor technique. For example, the second machine-learned model identifies the closest centroid of a first cluster to the first vector embedding, and the first cluster identifier is associated with the closest centroid of the first cluster. In another example, the first cluster includes a plurality of content items, the operation further includes ranking the plurality of content items to select a first content item having the highest score, wherein the first content item is transmitted to the user device in response to receiving the first request.

In some instances, the first result is a plurality of content items, and the operations further include processing the plurality of content items to select a final content item to present on a display of the user device.

In some instances, the first result is a single content item that is presented on the display of the user device.

In some instances, the first vector embedding is an N-dimensional space.

In some instances, the fuzzy cache includes a plurality of clusters, wherein each cluster includes at least one content item.

In some instances, the fuzzy cache uses similarity measures to match queries to cached entries that are sufficiently similar based on the feature.

In some instances, the fuzzy cache utilizes probabilistic data structures to efficiently approximate matches. For example, the probabilistic data structures include Bloom filters. In another example, the probabilistic data structures include Count-Min sketches.

Another example aspect of the present disclosure is directed to a computer-implemented method for presenting a content item in response to a first request. The method can include receiving, by a computing device, a request for the content item from a user device, the request having a feature. Additionally, the method can include processing, using a first machine-learned model, the request to generate a vector embedding. Moreover, the method can include processing, using a second machine-learned model, the vector embedding to generate a cluster identifier. Furthermore, the method can include retrieving, from a fuzzy cache, a first result based on the cluster identifier, wherein the fuzzy cache includes a plurality of cluster identifiers associated with a plurality of clusters.

In some instances, each cluster identifier in the plurality of cluster identifiers includes a result associated with a request.

In some instances, each cluster in the plurality of cluster includes at least one content item.

Yet another example aspect of the present disclosure is directed to one or more non-transitory computer-readable media that collectively instructions that, when executed by the one or more processors, cause a computing system to perform operations. The operations include receiving a request for the content item from a user device, the request having a feature. Additionally, the operations include processing, using a first machine-learned model, the request to generate a vector embedding. Moreover, the operations include processing, using a second machine-learned model, the vector embedding to generate a cluster identifier. Furthermore, the operations include retrieving, from a fuzzy cache, a first result based on the cluster identifier, wherein the fuzzy cache includes a plurality of cluster identifiers associated with a plurality of clusters.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts a flow chart of an example method for serving a content item using a fuzzy cache architecture according to example embodiments of the present disclosure.

Figure 1A:
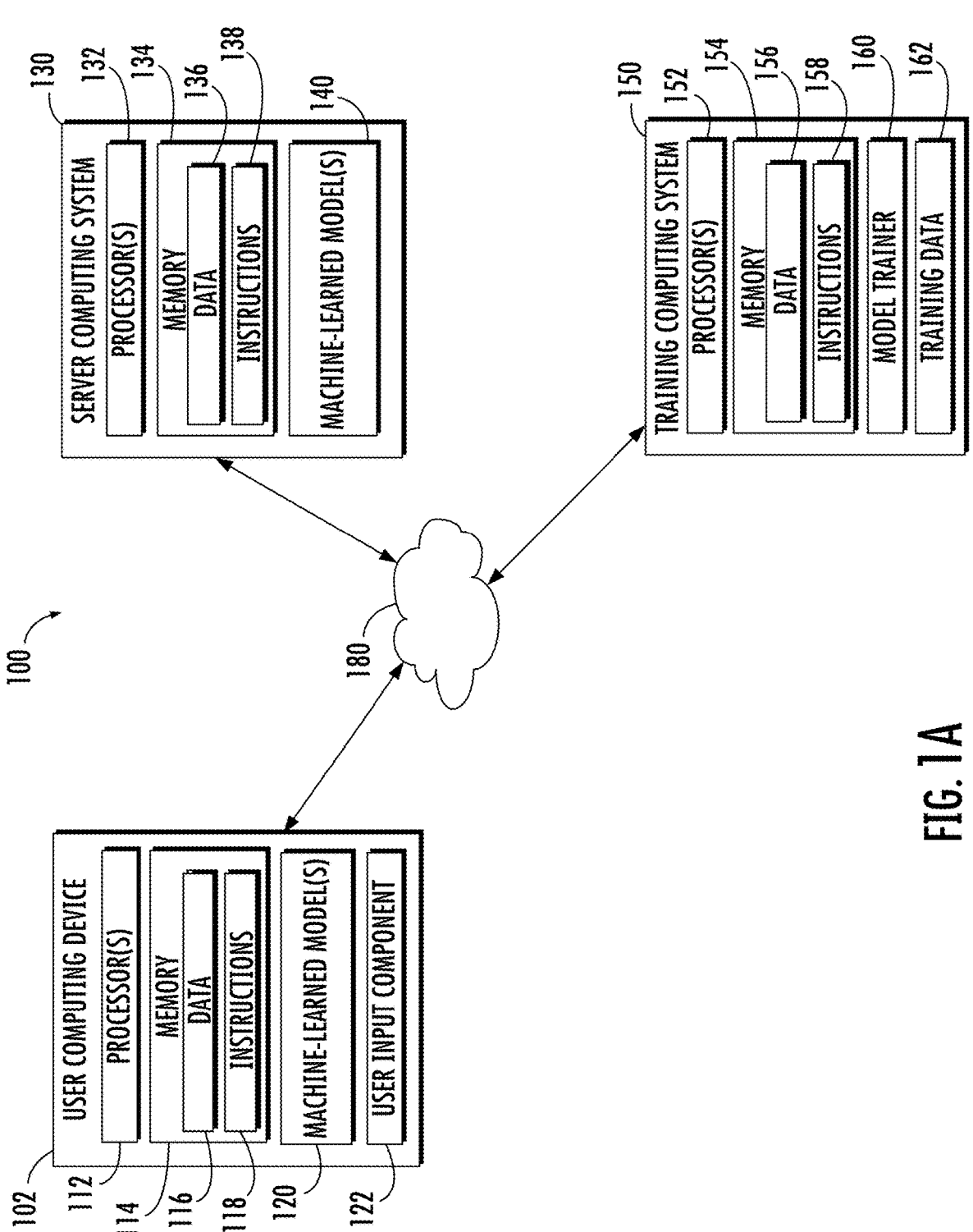
FIG. 1A depicts a block diagram of an example computing system according to example embodiments of the present disclosure.

Reference numerals that are repeated across plural figures are intended to identify the same features in various implementations.

DETAILED DESCRIPTION

Generally, the present disclosure is directed to systems and methods for using a fuzzy cache in a content serving system to reduce latency and computational resources for determining a content item to present in response to a query. In some implementations, as described herein, a first query is processed by a first machine-learned model to generate a vector embedding of a N-dimensional space. Subsequently, the vector embedding associated with the first query is processed by a second machine-learned model to generate a cluster identifier. The cluster identifier can be associated with a cluster of results associated with queries that are similar to the first query. The system can then process the cluster of results to determine a content item to present in response to the first query.

Query volume in content serving systems continues to grow year over year, which results in the growing computation costs of serving these queries. For each content item query, the content item serving system matches, ranks, and prunes the entire repository of content item candidates, which consumes a significant amount of computing resources. Thus, when the query rate increases by a first variable percentage, the required computation also increases by the first variable percentage. The increased computation cost directly affects resources of the content serving system, and provisioning systems for the increased computation needs is becoming increasingly challenging.

The content serving system can have a content item targeting cache that is based on a cache key. The cache key can be a set of query properties that affect content item eligibility and ranking. The cache value is a small set of highest ranking content items that are eligible to serve on queries with a matching cache key. According to current implementations, the cache has a global hit rate of approximately 50%, saving a large amount of computation. However, the remaining 50% of queries still need to match and rank the entire ad repository.

According to embodiments of the present disclosure, the fuzzy cache system can divide queries up into a discrete set of clusters. The set of clusters are less than the number of queries. The number of clusters is finite and can be set by an administrator of the content serving system or by a machine learning model. Queries in the same cluster tend to serve the same content items when full content item targeting is performed, as determined by a machine learning model.

The system can perform full content item targeting on representative queries from each cluster and write a finite set of ad candidates into the fuzzy cache, which can be keyed by a cluster identifier. The number of content item candidates written into the fuzzy cache is significantly smaller than the number of global content item candidates. Additionally, the content item candidates in each cluster are ranked by relevance and/or performance for queries in the cluster. For example, for a specific time window (e.g., 10 minutes, 15 minutes, 30 minutes, 1 hour) following a first content item targeting, incoming content item queries can restrict their content item matching and ranking to only those content items stored in the fuzzy cache for the current query's cluster. In doing so, the content item serving system will now only need to search and rank the entire ad repository on a minority of queries for new queries coming in.

During a real-time content serving scenario (e.g., when a user visits a website or application that serves sponsored content), the content serving system can retrieve relevant information from the cache management component and select relevant content items to display to that user based on their profile and the context of the current browsing of the user. Additionally, the cache management component can perform updates and refreshes. For example, the cache storage can be periodically updated and refreshed to ensure that the content being served remains relevant to current interests and behavior of users.

According to some embodiments, the content serving system can receive, from a user, a query for a content item. The content item can be a sponsored content item that has been uploaded by a content provider or generated for a content provider. The content serving system determines the content item to present (e.g., serve) to the user in response to the query. For example, an auction can occur with a plurality of content items to select the content item to present to the user. The content serving system can decide which content items from the content inventory management component to include in the auction. The content items selected to be included in the auction can be determined based on cache management components.

Computationally, it can be expensive to evaluate a large repository of content items to determine the content item to be present in response to the user query. Thus, in a standard workflow, the entire repository of content items is narrowed during a plurality of filtering operations by filtering out the content items that are not going to perform well in the specific query. For each filtering operation, the content serving operation calculates a score for each content item to determine which content item is filtered out. As the filtering operations continue to reduce the number of content items, the scoring of each content item becomes more precise and more computationally expensive. Therefore, the content serving system is optimized to perform the final calculations on a limited number of content items prior to sending the final list of content items to an auction. Without a cache management component, these calculations need to be performed for every incoming query, which is computationally expensive.

In some instances, the cache management component, which includes a content targeting cache, can improve the content serving process. The cache management component can utilize a cache key that is generated based on features of the query. The features of the query can include user information, browsing information, and context information. The user information includes a plurality of user data points about user behavior, interests, demographics, and other relevant user information. The browsing information can include browsing history, search queries, location information, device type, dimension of the slot for presenting the content item, and other browsing information. The context information can include context associated with user current interaction prior to submitting the request. For example, the user can be on a gaming application and submitting a request for a content item. In another example, the user can be reading an article on a digital platform, and then submit a request for a content item. In some instances, a third-party server (e.g., digital platform) can submit the request for the content item on behalf of the user.

A cache key can be a unique identifier used to retrieve data from a cache. In the context of caching systems, a cache key can be generated based on certain input parameters or criteria associated with the data being cached. Before storing data in the cache, a cache key is generated based on one or more attributes of the data. These attributes could include unique identifiers, query parameters, or any other relevant information that distinguishes the data from other entries in the cache. The cache key can be computed using a deterministic algorithm that consistently produces the same key for the same set of input parameters. This ensures that identical requests yield the same cache key, allowing for efficient retrieval of cached data. When a request is made to retrieve data from the cache, the cache key associated with that data is used to perform a lookup operation. If the data corresponding to the cache key is found in the cache, the cached data is returned to the requester without the need to access the original data source. If the cache key does not match any entries in the cache, Cache keys provide a mechanism for efficient storage and retrieval of data, as well as facilitating cache management and maintenance.

In one example, when a first search query is received, the content serving system can determine the content to present by utilizing the computationally expensive method of narrowing the repository of content items using a plurality of filtering operations. Once the content item is selected for the first search query, the results of the query can be stored in the content targeting cache. The results can include the final list of content items and/or the selected content item along with the cache key. Subsequently, a second search query is received having an identical or similar cache key. Then, the content serving system can reuse the results from the first query. For example, the content serving system can retrieve the selected content item to be presented in response to the second search query. In another embodiment, the content serving system can send the final list of content items to an auction to determine a selected content item to present in response to the second search query. By storing the results in the cache and reusing the results in a subsequent search, then the content serving system reduces computation resources. For example, when the cache hit rate of about 50%, the system saves about 50% of the computational costs associated with serving content.

According to some embodiments, the system can utilize a fuzzy cache to further reduce the computation costs associated with serving a content item. For example, when the cache key does not match any entries in the cache (i.e., a cache miss), the system can then determine if the query is sufficiently similar to a previous query by using a fuzzy cache. The fuzzy cache can provide a fallback mechanism to handle cache misses associated with the cache key not having a match. Continuing with the example above, the fuzzy cache provides a more efficient data retrieval for remaining 50% of the queries associated with a cache miss, which in conventional methods, the content serving system would have to search the entire content item repository. The fuzzy cache can be associated with a fuzzier notion of a cache when two queries are not an exact match having the same cache key. For example, when the second query is sufficiently similar with the first query, the system can use hints from the first query to filter content items prior to evaluating a subset of content items for the second query. The hints can provide the system with parameters for content items that are likely to perform well. As a result, the system can remove a large portion of content items from the content item repository prior to scoring the subset of content items to determine the selected content item to present in response to the second search query. final group of content items. Thus the fuzzy cache enables the system to determine whether two queries are sufficiently similar. When two queries are sufficiently similar, the result of the first query can be utilized to reduce the computational processing for determining a result for the second query.

Additionally, the fuzzy cache can use a machine-learned model to group all incoming queries into a finite set of clusters. The fuzzy cache can be a type of caching mechanism that introduces a level of uncertainty or approximation in the cache lookup process. Unlike traditional caches, which rely on exact matches between cache keys and stored data, the fuzzy cache allows for approximate matches based on similarity metrics or probabilistic techniques.

The fuzzy cache can enable approximate matching by relaxing the requirement for exact matching between cache keys and query parameters. Instead, the fuzzy cache can use similarity measures to match queries to cached entries that are sufficiently similar based on certain criteria. Additionally, the fuzzy cache can utilize similarity metrics such as edit distance, cosine similarity, Jaccard index, or other distance measures to quantify the similarity between query parameters and cached entries. These metrics assess how similar two data points or strings are based on their characteristics. Moreover, the fuzzy cache can use probabilistic data structures like Bloom filters or Count-Min sketches to efficiently approximate matches. These data structures can trade-off a small probability of false positives for improved memory efficiency and faster lookup times. Furthermore, the fuzzy cache can allow for a certain degree of tolerance or error in the matching process. The machine-learned model can update the thresholds or parameters that control how closely a query must match a cached entry to be considered a valid match. The thresholds or parameters can be updated to improve the efficiency of the content serving process by balancing cost of serving content with the performance (e.g., click-through rate, conversion rate, impressions) of the content items. As a result, the fuzzy cache improves cache hit rates and resilience to variations in query parameters or data distributions. Additionally, the fuzzy cache reduces the reliance on centralized caches, and improves scalability.

A content serving system can include a cache management component (e.g., cache management system). The cache management component can include a content item targeting cache. The cache management component plays a crucial role in the efficiency and effectiveness of digital campaigns by facilitating the rapid selection and delivery of targeted content to the right audience. The cache management component can include a cache storage to store previously presented content items which have been targeted to users based on user data and content targeting techniques. The cache storage can store information related to the profiles and preferences of users, as well as information about available content items. The user data includes browsing information, a plurality of user data points about user behavior, interests, demographics, and other relevant user information. The user data can include browsing history, search queries, location information, device type, and other browsing information. For example, the content serving system can utilize the user data to create targeted digital campaigns. The content provider can specify to the content serving system targeting criteria (e.g., age, gender, location, interests, and browsing habits) to ensure that their content reaches a relevant audience. The techniques described herein provide several technical effects and benefits. Aspects of the present disclosure can provide several technical improvements by employing caching mechanisms using the cache management component to optimize the delivery of targeted content and reduce the time to select appropriate content for a given user.

Examples of the disclosure provide several technical effects, benefits, and/or improvements in computing technology and artificial intelligence techniques that involve the use of a fuzzy cache architecture to serve content items to user devices. The techniques described herein improve the serving on content items by reducing the latency and computing resources for serving content items. Additionally, the system utilizes better training techniques by developing more efficient and effective training techniques to improve accuracy and increase the percentage of cache hits. Furthermore, the present disclosure can reduce processing by reducing the content item queries that require a search of the entire repository of content items. The fuzzy cache plays a crucial role in improving the performance of content item serving systems by enabling faster response time, reducing server load, optimizing bandwidth, improving the availability of high ranking content items, and providing an accurate targeted content delivery system. The content item serving systems often need to process a high volume of requests in real-time. By using the fuzzy cache architecture, the system can respond more quickly to incoming requests. This leads to reduced latency and faster content item delivery, which enhances the user experience. Additionally, the fuzzy catch helps offload the backend servers by serving frequently requested content directly from the cache. This reduces the number of requests that need to be processed by the entire repository of content items, thereby lowering the overall server load and improving scalability. Moreover, fuzzy cache stores copies of frequently accessed resources closer to the end-users, reducing the need to fetch these resources from distant servers. This optimization conserves bandwidth and reduces network congestion, especially in distributed content item serving systems with users located across different geographical regions. Furthermore, the fuzzy cache can act as a buffer against sudden spikes in traffic or server failures. By serving cached content when the origin server is unavailable, caches help maintain service availability and prevent downtime, ensuring that ads continue to be delivered even under adverse conditions. The fuzzy cache, using the cluster identifiers, can store and serve personalized or targeted content based on user preferences, browsing history, and demographic information. By delivering relevant content from the fuzzy cache, serving systems can enhance ad effectiveness and increase click-through rates.

Moreover, using the techniques described herein, the system can improve performance of the content item serving system, while maintaining the accuracy of the targeted content being delivered. In some instances, after the results have been retrieved from the fuzzy cache, the system can perform a safeguard operation to ensure the accuracy of the content items being presented. The safeguard operations can determine whether the retrieved results are acceptable by the policies and constraints of the content provider, customer, and content item serving system. For example, the content item serving system can ensure that the results abide by the predetermined privacy and security protocols.

Example Devices and Systems

FIG. 1A depicts a block diagram of an example computing system 100 that performs image editing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 (e.g., inpainting model) can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In other examples, the models 120 can be specific embedding models or a similarity search models which are differentiable, and which have been parameterized to facilitate application of machine learning techniques. Example models 120 are discussed with reference to FIGS. 2-5.

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120.

More particularly, the models 120 can be trained using a training computing system 150 with a set of training data 162 to train the parameters of the model to optimize the model. The training data can include results of previously executed request queries, performance data of serving content items, and user feedback in response to being served a content item.

Additionally, or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service (e.g., an image editing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, a plurality of queries, and the corresponding results for each query.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
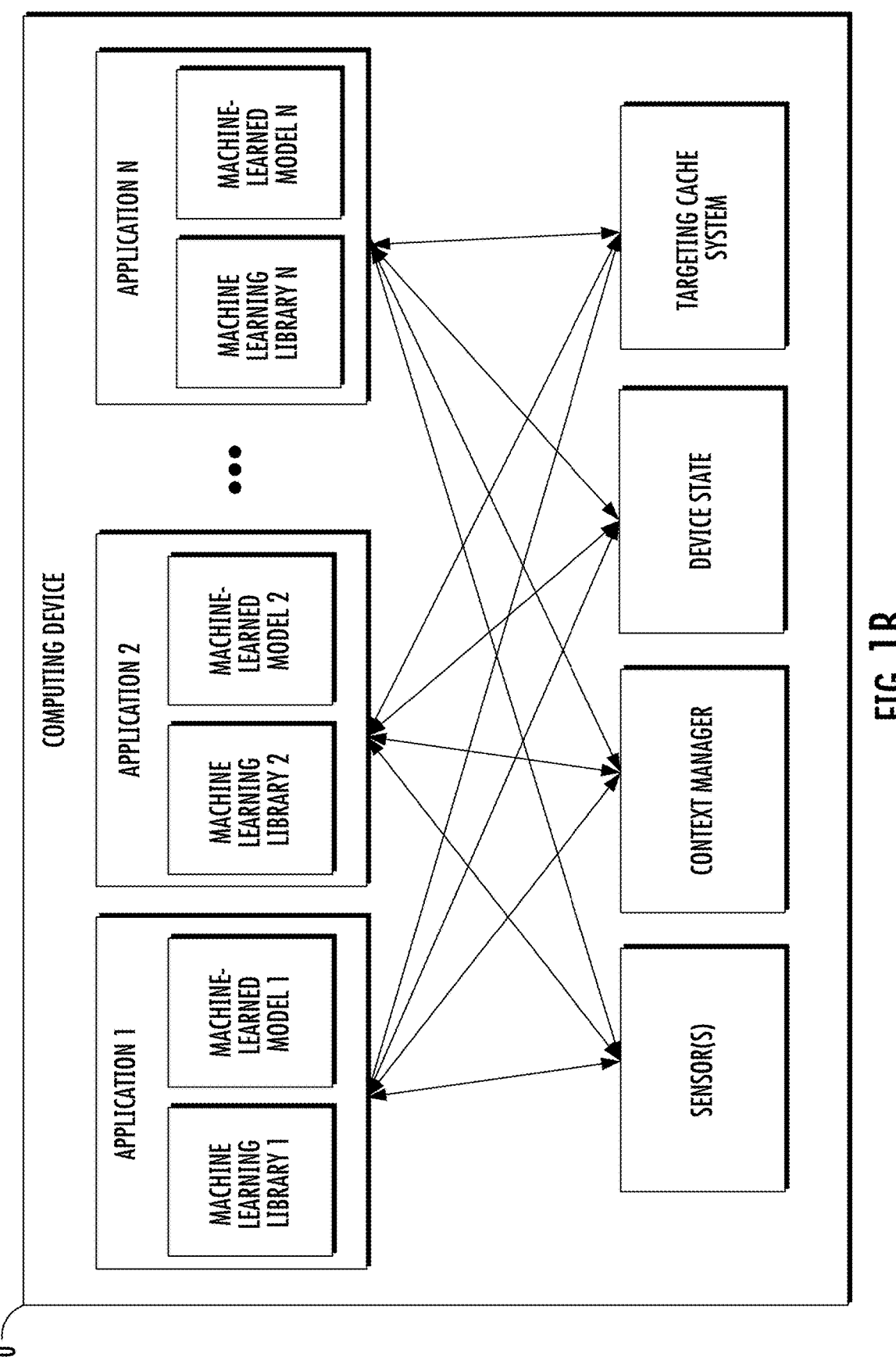
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
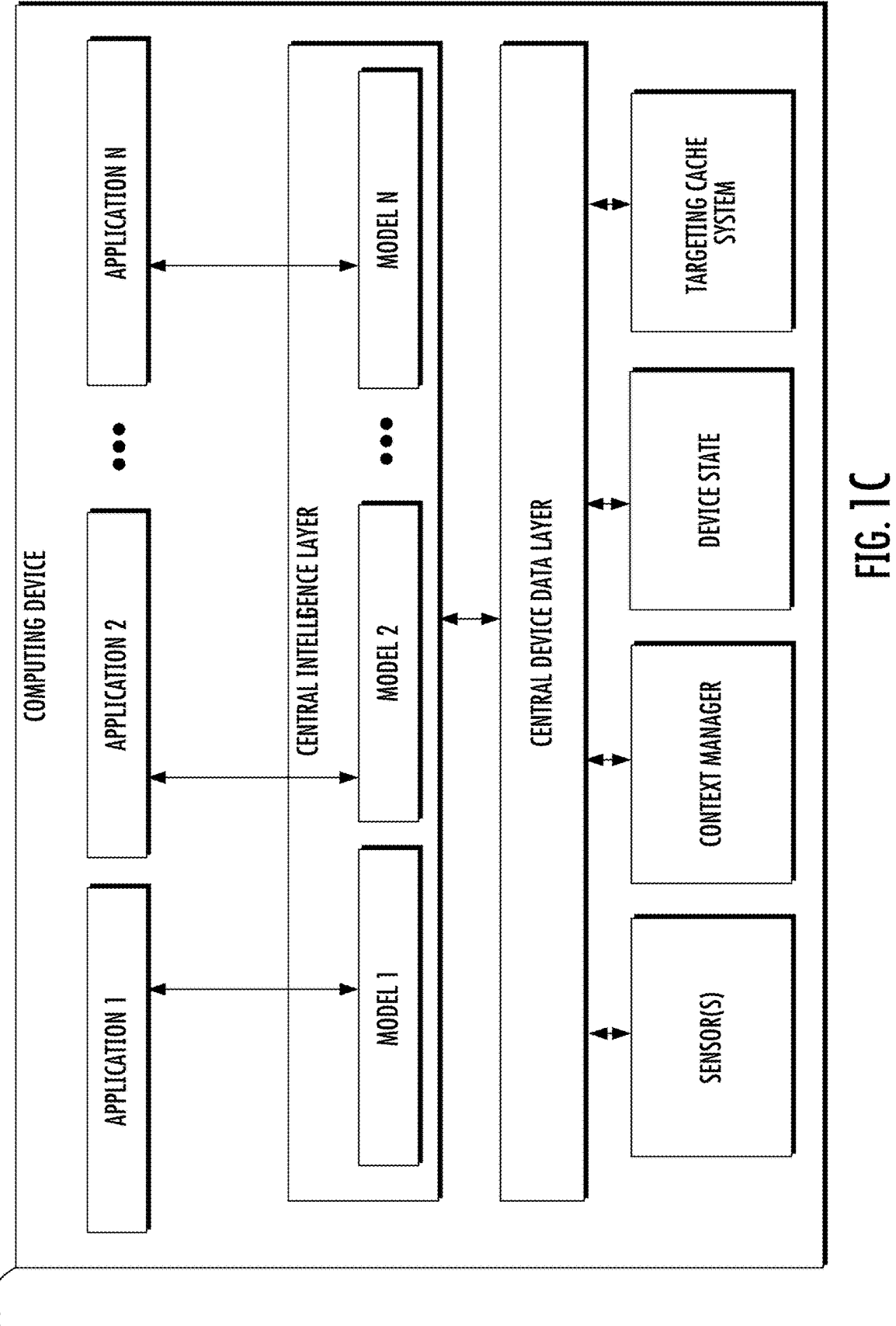
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
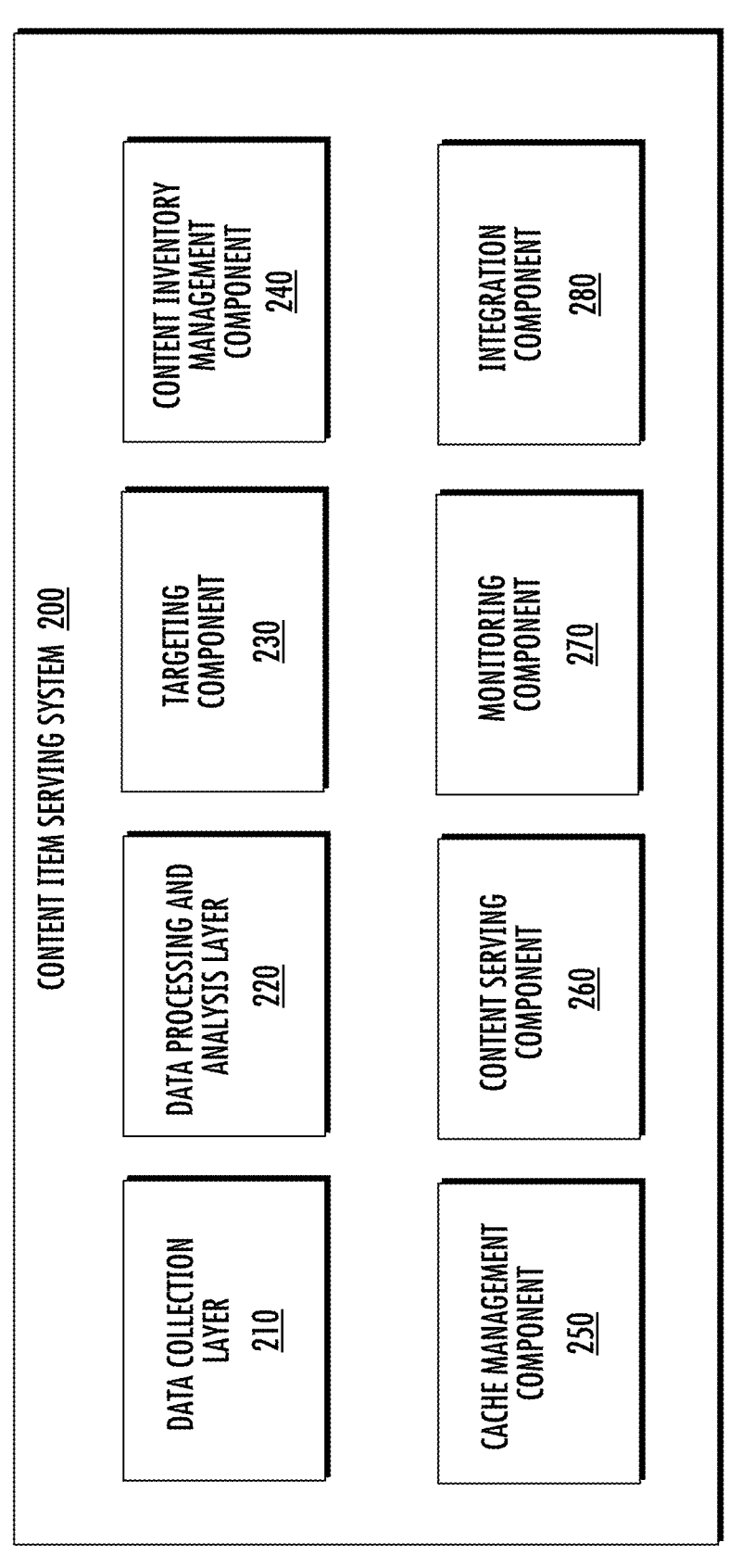
FIG. 2 depicts a block diagram of an example content item serving system 200 according to example embodiments of the present disclosure.

FIG. 2 depicts a block diagram of a content serving system 200 with a targeting cache according to example embodiments of the present disclosure. The targeting cache system 200 includes a data collection component 210, a data analysis component 220, a targeting component 230, a content inventory management component 240, a cache management component 250, a content serving component 260, a monitoring component 270, and an integration component 280.

The components 210-280 can communicate with each other and work together to collect, process, store, and serve targeted content to users efficiently. By orchestrating components 210-280 effectively, the content serving system 200 can deliver targeted content items to users in a timely and relevant manner, maximizing campaign effectiveness while minimizing operational overhead.

The data collection component 210 can receive raw data from various sources, including websites, mobile apps, and third-party data providers. The raw data can include user interactions, browsing history, search queries, demographics, location information, and device types.

The data analysis component 220 can process and analyze the raw data to generate process data. The process data can include meaningful insights, hints, and relevant information about user profiles. The data analysis component can involve real-time stream processing as well as batch processing of historical data. Techniques such as machine learning, data mining, and statistical analysis can be employed to derive user preferences, interests, and behavior patterns.

The targeting component 230 can determine which content item to serve each user based on the process data generated by the data analysis component 220. In some instances, the targeting component 230 can match user attributes (e.g., demographics, interests) with targeting criteria specified by the content provider. Additionally, the targeting component 230 can utilize machine-learned models, algorithms and rules to select the most relevant content item for each user in real-time.

The content inventory management component 260 can manage the inventory of available content items that can be served to users. The content inventory management component 260 can store information about content item creatives, targeting criteria, bidding information, and campaign budgets. Additionally, content providers can interact with the content inventory management component to upload and manage their content item campaigns.

The cache management component 250 includes a content item targeting cache. The content item targeting cache stores precomputed targeting decisions and content item creatives. The cache management component optimizes content item serving by reducing latency and improving scalability. Additionally, the targeting cache system 200 can include cache eviction policies and strategies that are implemented to manage cache size and ensure freshness of data.

The content serving component 260 can serve content items to users in real-time. In some instances, the content serving component 260 can serve a content item stored in the cache management component 250 based on the targeting decisions. The content serving component 260 can interface with websites, mobile apps, or other digital platforms where the content items are displayed.

The monitoring component 270 can provide monitoring, logging, and reporting capabilities to track system performance, content delivery metrics, and compliance with regulations. The monitoring component can generate alerts and notifications for issues such as downtime, performance degradation, or policy violations.

The integration component 280 can facilitate integration with external systems such as demand-side platforms, data management platforms, content item exchanges, and content item networks. APIs and standard protocols can be used for seamless communication between different components of the content tech ecosystem.

In some instances, a potential issue with fuzzy caching can be that reviving and selecting candidates for similar (but not identical) queries may result in targeting rule violations. A solution for this problem can be to revive candidates from a fuzzy cache hit and then execute necessary filtering and/or matching logic to ensure candidate correctness. For example, if the system removes mobile-browser-class from the set of mandatory cache keys, the system may need to implement a post-cache-hit filter to ensure that the candidate's target mobile browser class matches the query's mobile browser class.

In some instances, another potential issue with fuzzy caching can be that the feature and prediction skews between mixer models and shard models. Such skews can result in not selecting the optimal content item based on the prediction of the mixer. Fuzzy caching can be used to estimate the mixer optimal content item based on history. According to some embodiments, the system can perform a query clustering process, and then consider the top-ranked content items of a cluster for queries in that cluster.

Example Flow Diagrams

Figure 3:
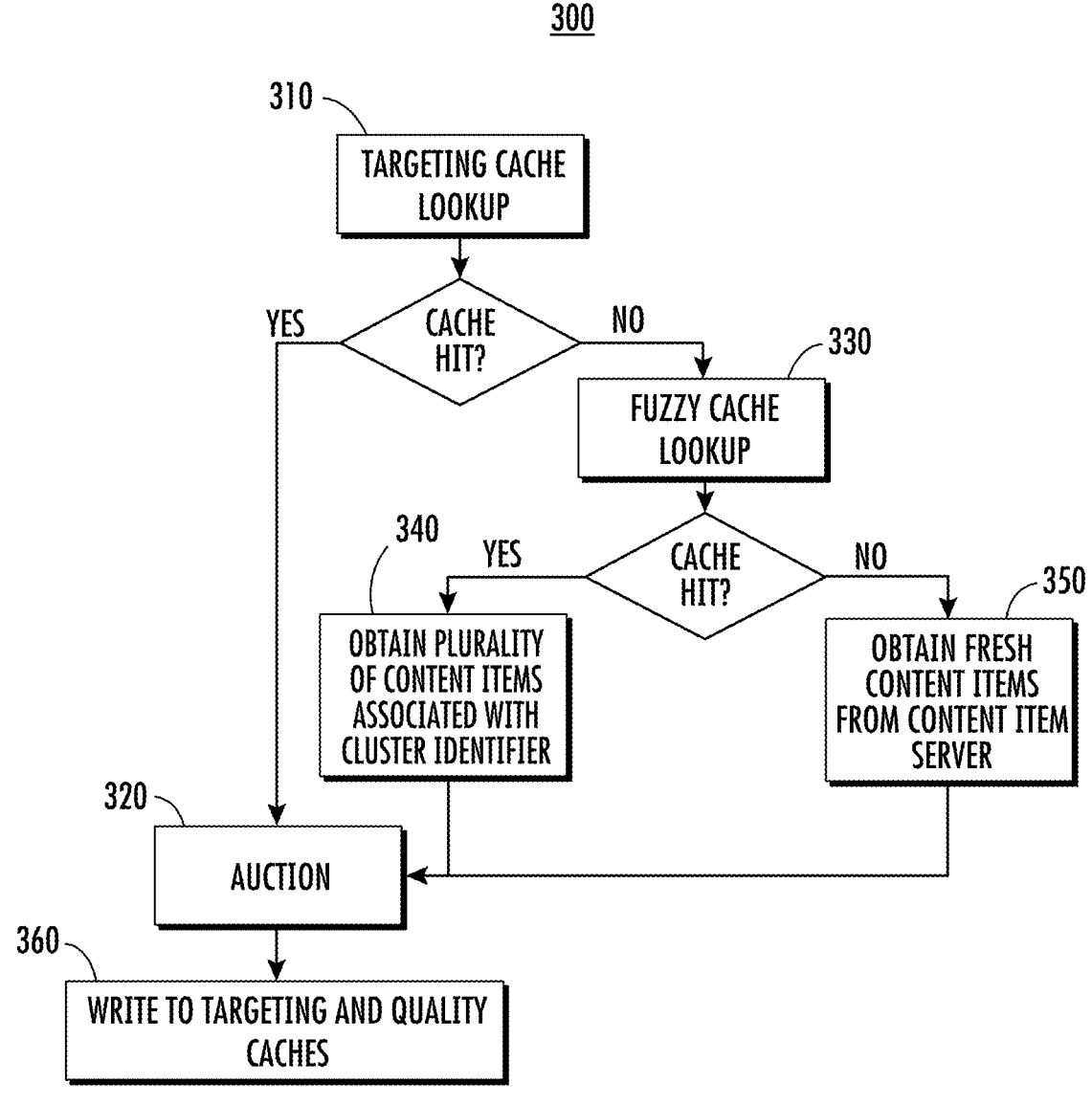
FIG. 3 depicts a flow diagram of an example technique for serving a content item using a fuzzy cache, according to example embodiments of the present disclosure.

FIG. 3 depicts a flow diagram of an example technique 300 for serving a content item using a fuzzy cache, according to example embodiments of the present disclosure. In some implementations, the computing system (user computing device 102, server computing device 130, training computing device 150, computing device 10, computing device 50, content item serving system 200) can present a content item in response to a query using the example technique 300 described in FIG. 3.

At operation 310, the system can perform a targeting cache lookup.

If there is a cache hit, then the system returns a prediction at operation 320. Additionally, the system can write to targeting and quality cache at operation 360.

Alternatively, if there is not a cache hit (i.e., cache miss), then the system can perform a fuzzy cache lookup at 330. If there is a fuzzy cache hit, then the system can get the quality cache candidates from the fuzzy cache. However, if there is not a fuzzy cache hit, then the system can get fresh candidates. Subsequently, the system returns a prediction at operation 320 based on the quality cache candidates or the fresh candidates. Additionally, the system can write to targeting and quality cache at operation 360.

According to some embodiments, the system architecture includes a fuzzy cache as additional cache. The fuzzy cache can utilize a lookup key to determine a cache hit at operation 330. The lookup key can be based on a query similarity score. The lookup key can be a continuous value rather than a discrete match or no-match value of a cache key. The cache key can be utilized in the targeting cache lookup at operation 310. The system can find one or more candidates from sufficiently similar queries to obtain quality cache candidates (e.g., fuzzy candidates). Subsequently, the system can call to the fuzzy cache specifying the quality cache candidates to fetch these candidates and execute all appropriate matching logic.

The first machine-learned model can be trained in an embedding space, to which the first machine-learned model is given a query and returns a list of zero or more nearest neighbors: similar queries from the past TTL minutes. The distance between a first query (Q1) and a subsequent second query (Q2) in this embedding represents how well the retrieval result of Q1 will do if reused for Q2 and vice versa-retrieval result means what is written to the cache. In some instances, the model can be trained based on a cost function associated with the revenue impact of reusing the results of Q1 for Q2. The training can optimize for how well the retrieval result of Q1 and Q2 can perform: if [(A1, A1_score), . . . , (An, An_score)] are Q1's and [(B1, B1_score), . . . , (Bm, Bm_score)] are Q2's result. The system can define various similarity functions and experiment with which one most closely approximates revenue.

Once the system picks one or two similarity scores to proceed with, the system can get the retrieval result (the said list) logged for queries, and then feed billions of (Q1, Q2) pairs along with their corresponding similarity scores fed to the training of the embedding space.

Figure 4:
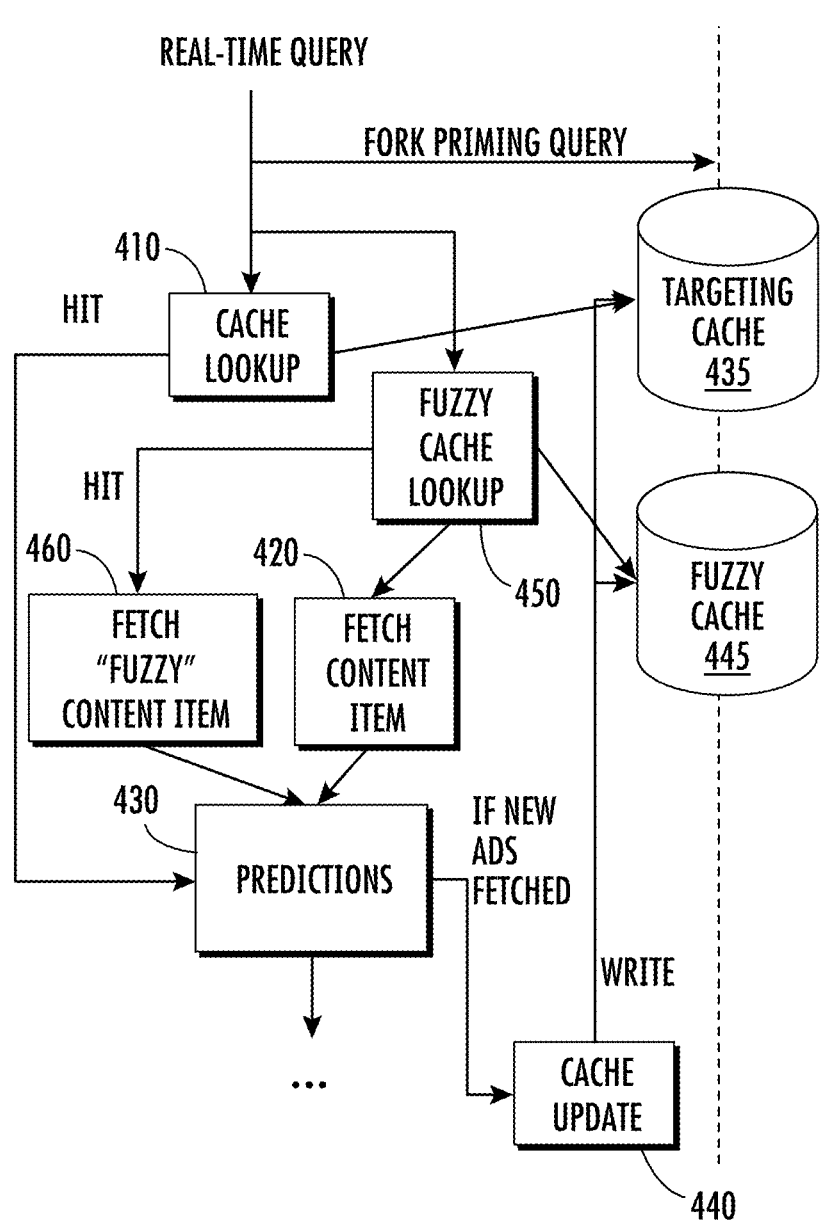
FIG. 4 depicts a flow diagram of another example technique for serving a content item using a fuzzy cache, according to example embodiments of the present disclosure.

FIG. 4 depicts a flow diagram of an example technique 400 for serving a content item using a fuzzy cache, according to example embodiments of the present disclosure. In some implementations, the computing system (user computing device 102, server computing device 130, training computing device 150, computing device 10, computing device 50, content item serving system 200) can present a content item in response to a query using the example technique 400 described in FIG. 4.

At operation 410, the system can execute a real-time query by performing a cache lookup using a targeting cache 435 with a cache key. If there is a cache hit, then the system can fetch a content item at operation 420 based on the cache key. The system can return a prediction associated with fetch content item at operation 430 in response to the real-time query. Additionally, the system can perform a cache update at operation 440 by writing in the targeting cache 435.

Alternatively, if there is not a cache hit (i.e., cache miss) with the cache key and the targeting cache 435, then the system can perform a fuzzy cache lookup at operation 450. If there is a fuzzy cache hit, then the system can fetch the fuzzy content items at operation 460. The system can return a prediction associated with the fetched fuzzy content item at operation 430 in response to the real-time query. Additionally, the system can perform a cache update at operation 440 by writing in the targeting cache 445 with the fuzzy content item.

In some instances, if there is not a fuzzy cache hit, then the system can get fresh candidates as illustrated in the priming query operations 470 that can fetch candidates by searching and ranking the entire repository of content items. The priming query operations 470 can be off the latency-critical path.

Example Methods

FIG. 5 depicts a flow chart diagram of an example for serving content items using a fuzzy cache architecture, according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

In some instances, the method 500 can include a fuzzy cache. The fuzzy cache can include a plurality of clusters. Each cluster can have a cluster identifier. Additionally, each cluster can have at least one result (e.g., content item) that is associated with a previously executed request.

The computing system can be user computing device 102, server computing system 130, training computing system 150, computing device 10, computing device 50, or content item serving system 200. The computing system can use one or more processors (e.g., processor(s) 112, 132, 152) to serve a content item to a user device in response to a query.

In some instances, as illustrated in operation 310 of FIG. 3 and operation 410 of FIG. 4, the system can perform a targeting cache lookup using a cache key. The cache key is generated based on the first request that is received at operation 502. If there is an exact match with the cache key, then there is a cache hit and the process goes directly to the auction (e.g., operation 320 in FIG. 3, operation 430 in FIG. 4) with the one or more content items associated with the cache key. Alternatively, if there is not an exact match with the cache key (i.e., cache miss), then the system performs the fuzzy cache lookup as described in operation 320 in FIG. 3 and operation 450 in FIG. 4. Method 500 describes the process associated with the fuzzy cache lookup.

The method 500 can include a first machine-learned model that is configured to generate a vector embedding. Additionally, The method 500 can include a second machine-learned model that is configured to generate a cluster identifier.

At operation 502, the system can receive, from a user device, a first request having a first feature. For example, the first request can include keywords associated with a search request. The first feature can be derived from the keywords, user information, browsing information, and/or context information.

In some instances, the first feature can be based on user information associated with a user of the user device. In some instances, the first request includes a second feature that can be based on browsing information of the user device. In some instances, the first request includes a third feature that can be based on context information.

For example, the features of the request (e.g., query) can include user information, browsing information, and context information. The user information includes a plurality of user data points about user behavior, interests, demographics, and other relevant user information. The browsing information can include browsing history, search queries, location information, device type, dimension of the slot for presenting the content item, and other browsing information. The context information can include context associated with user current interaction prior to submitting the request. For example, the user can be on a gaming application and submitting a request for a content item. In another example, the user can be reading an article on a digital platform, and then submit a request for a content item. In some instances, a third-party server (e.g., digital platform) can submit the request for the content item on behalf of the user.

At operation 504, the system can process, using the first machine-learned model, the request to generate a first vector embedding associated with the first request.

In some instances, the first machine-learned model can process the first feature and/or the second feature to generate the first vector embedding.

In some instances, the first vector embedding is an N-dimensional space (e.g., 32 dimensional space, 64 dimensional space, 128 dimensional space).

For example, the first machine-learned model can be an embedding model that outputs a vector embedding based on an input associated with a search request. The embedding model can be used in information retrieval and natural language processing tasks, including search engines and recommendation systems. The first machine-learned model (e.g., embedding model) can take input data, such as features in the case of search requests, and map them to vector embedding (e.g., high-dimensional vector representations). The vector embedding can capture the semantic and contextual information of the input in a continuous vector space, allowing for efficient similarity calculations and retrieval. In the context of search requests, the input data could be keywords entered by a user, user information, browsing information, and/or context information, and the embedding model can transform these queries into fixed-length vector representations. The vector embedding can then be compared with embeddings of prior executed requests using the second machine-learned model to retrieve relevant results (e.g., a content item, a plurality of content items, identifiers associated with a plurality of content items). Examples of embedding models include transformer-based models like BERT (Bidirectional Encoder Representations from Transformers) and its variants. These models are trained on large text corpora using unsupervised or semi-supervised learning methods to learn meaningful representations of words or phrases. Once trained, the embedding model can be used to generate embeddings for search queries, which can then be used to retrieve relevant results (e.g., content items) from the fuzzy cache efficiently.

At operation 506, the system can process, using the second machine-learned model, the first vector embedding to determine a first cluster identifier. In some instances, to retrieve a cluster identifier based on a vector embedding, the system can use a similarity search algorithm or technique. Other similarity measures, such as Euclidean distance or Pearson correlation coefficient, can also be used in method 500.

As previously mentioned, one example of a similarity search technique is the cosine similarity measure. Cosine similarity calculates the cosine of the angle between two vectors in a high-dimensional space. The system can measure the similarity between two vectors regardless of their magnitude, focusing only on the orientation. In the context of vector embeddings, cosine similarity is used to compare the similarity between the embedding of the first request and the embeddings of content items in the fuzzy cache. For each content item in the fuzzy cache, the cosine similarity between the vector embedding and the content item's embedding is computed. This yields a similarity score, indicating how closely the content item matches the first request in the embedding space. The content items are ranked based on their similarity scores. Content items with higher similarity scores are considered more relevant to the first request and can be included as part of the first result that is retrieved at operation 508 from the fuzzy cache.

According to some embodiments, the system can retrieve relevant results (e.g., content item(s), identifier(s) associated with content item(s)) based on the vector embedding that is generated at operation 504. A similarity technique, such as cosine similarity or similar measures can be employed to compare embeddings and rank content items accordingly, enabling efficient and accurate content information retrieval.

In some instances, the second machine-learned model can determine the first cluster identifier by using a nearest-neighbor technique. For example, the second machine-learned model identifies the closest centroid of a first cluster to the first vector embedding, and the first cluster identifier is associated with the closest centroid of the first cluster.

In cluster retrieval, the nearest-neighbor technique is used to find the most similar clusters to a given query cluster. This technique involves comparing the features or characteristics of clusters and identifying the closest matches based on some similarity measure. For example, each cluster in the dataset is represented by a set of features or attributes. These features can include statistical properties, centroid coordinates, density measures, or other characteristics that describe the cluster's contents and structure. A similarity metric can be defined to quantify the similarity between clusters based on their feature representations. Common similarity measures used in cluster retrieval include Euclidean distance, cosine similarity, Jaccard index, or other distance metrics tailored to the specific nature of the data. When a query cluster is provided, the system tries to find the clusters in the dataset that are most similar to the query cluster based on the defined similarity metric. The nearest-neighbor search algorithm can be applied to identify the closest clusters to the query cluster in the feature space. This involves calculating the similarity between the query cluster and each cluster in the dataset and selecting the clusters with the highest similarity scores. According to one embodiment, a threshold may be applied to filter out clusters that do not meet a certain similarity criterion. The thresholding can help control the number of retrieved clusters and ensures that only sufficiently similar clusters are returned. The retrieved cluster, which can include a plurality of content items, can be ranked based on their similarity scores, with the most similar clusters ranked higher in the list. The top-ranked clusters are then returned as the nearest neighbors of the query cluster. The nearest-neighbor technique provides a flexible and efficient approach to finding similar clusters in large datasets, enabling tasks such as cluster analysis, pattern recognition, and data exploration.

At operation 508, the system can retrieve, from the fuzzy cache, a first result on the first cluster identifier. The first cluster identifier can be associated with the cluster that includes results that are most similar to results associated with the first request.

For example, the first result can be a single content item when the cluster only includes one content item. In another example, the first result can be a plurality of content items when the cluster includes a plurality of content items. In yet another example, the first result can be a subset of the plurality of content items, where the subset includes the highest ranked content items based on operation 506. In yet another example, the first result can be an identifier associated with a content item or a plurality of identifiers associated with a plurality of content items. In this example, the system can retrieve the content items for a separate database based on the identifier. In yet another example, the first result can be a signal that there is zero content item in the cluster. When the result is the signal that there is zero content item in the cluster, then the system may omit the auction process (e.g., operation 320 in FIG. 3) because there is a high likelihood that there is not a valid result for the first request, which results in saving computational resources.

In some instances, the first result is a single content item that is presented on the display of the user device.

In some instances, the first result can be associated with queries that are similar to the first query.

In some instances, the first cluster includes a plurality of content items. Additionally, method 500 can further include ranking the plurality of content items to select a first content item having the highest score, wherein the first content item is transmitted to the user device in response to receiving the first request.

In some instances, the first result is a plurality of content items. Additionally, method 500 can further include processing the plurality of content items to select a final content item to present on a display of the user device.

In some instances, the fuzzy cache includes a plurality of clusters, wherein each cluster includes at least one content item. In another example, a cluster may contain zero content item. When the selected cluster contains zero content item, then the fuzzy cache sends back a signal that there is zero content item associated with the cluster identifier to the auction. This can result in reducing computing processing, because the auction can save resources by not running its typical process given that it is known that there is not a good content item to be presented.

In some instances, the fuzzy cache uses similarity measures to match queries to cached entries that are sufficiently similar based on the feature.

In some instances, the fuzzy cache utilizes probabilistic data structures to efficiently approximate matches. In some instances, the probabilistic data structures include Bloom filters. In some instances, the probabilistic data structures include Count-Min sketches.

Additional Disclosure

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system, comprising:
   one or more processors; and one or more non-transitory computer-readable media that collectively store:

a fuzzy cache having a plurality of cluster identifiers, each cluster identifier in the plurality of cluster identifiers having a result associated with a previously executed request;

a first machine-learned model, wherein the first machine-learned model is configured to generate a vector embedding;

a second machine-learned model, wherein the second machine-learned model is configured to generate a cluster identifier; and instructions that, when executed by the one or more processors, cause the computing system to perform operations, the operations comprising:

receiving, from a user device, a first request having a first feature and a second feature;

processing, using the first machine-learned model, the first request to generate a first vector embedding associated with the first request, wherein the first machine-learned model processes the first feature and the second feature to generate the first vector embedding;

processing, using the second machine-learned model, the first vector embedding to determine a first cluster identifier; and retrieving, from the fuzzy cache, a first result on the first cluster identifier, wherein the first result is associated with queries that are similar to the first request, wherein probabilistic data structures are used to determine the queries that are similar to the first request, and wherein the fuzzy cache serves the first result when an original data store is unavailable.

2. The computer system of claim 1, wherein the first result includes a set of content items, each content item in the set of content items having a relevancy score associated with a relevance to queries associated with the first cluster identifier.

3. The computer system of claim 1, wherein the first feature is based on user information associated with a user of the user device.

4. The computer system of claim 1, wherein the second feature is based on browsing information of the user device.

5. The computer system of claim 4, wherein the first request further includes a third feature that is based on context information.

6. The computer system of claim 5, wherein the first machine-learned model processes the first feature, the second feature, and the third feature to generate the first vector embedding.

7. The computer system of claim 1, wherein the second machine-learned model determines the first cluster identifier by using a nearest-neighbor technique.

8. The computer system of claim 7, wherein the second machine-learned model identifies a closest centroid of a first cluster to the first vector embedding, and wherein the first cluster identifier is associated with the closest centroid of the first cluster.

9. The computer system of claim 7, wherein the first cluster identifier includes a plurality of content items, the operation further comprising:

ranking the plurality of content items to select a first content item having a highest score, wherein the first content item is transmitted to the user device in response to receiving the first request.

10. The computing system of claim 1, wherein the first cluster identifier includes a plurality of content items, wherein each content item in the plurality of content items is associated with a relevance score, the operations further comprising:

determining a subset of content items from the plurality of content items based on the relevance score of each content item;

transmitting the subset of content items to an auction, wherein the auction determines a selected content item to be transmitted to the user device in response to receiving the first request.

11. The computer system of claim 10, the operations further comprising:

performing safeguard operation to ensure that the subset of content items abide by a predetermined privacy and security protocol prior to transmitting the subset of content items to the auction.

12. The computer system of claim 1, wherein the first result is a plurality of content items, and the operations further comprising:

processing, based on a relevancy score of each content item, the plurality of content items to select a final content item to present on a display of the user device.

13. The computer system of claim 1, wherein the first result is a single content item that is presented on a display of the user device.

14. The computer system of claim 1, wherein the first vector embedding is an N-dimensional space.

15. The computer system of claim 1, wherein the fuzzy cache includes a plurality of clusters, wherein each cluster includes at least one content item.

16. The computer system of claim 1, wherein the fuzzy cache uses similarity measures to match queries to cached entries that are similar based on the first feature.

17. The computer system of claim 1, wherein the probabilistic data structures is a bloom filter.

18. A computer-implemented method for presenting a content item in response to a first request, the method comprising:

receiving, by a computing device, the first request for the content item from a user device, the first request having a first feature and a second feature;

processing, using a first machine-learned model, the first request to generate a vector embedding, wherein the first machine-learned model processes the first feature and the second feature to generate the vector embedding;

processing, using a second machine-learned model, the vector embedding to generate a cluster identifier; and retrieving, from a fuzzy cache, a first result based on the cluster identifier, wherein the fuzzy cache includes a plurality of cluster identifiers associated with a plurality of clusters, wherein the first result is associated with queries that are similar to the first request, wherein probabilistic data structures are used to determine the queries that are similar to the first request, and wherein the fuzzy cache serves the first result when an original data store is unavailable.

19. One or more non-transitory computer-readable media that collectively instructions that, when executed by the one or more processors, cause a computing system to perform operations, the operations comprising:

receiving a request for a content item from a user device, the request having a first feature and a second feature;

processing, using a first machine-learned model, the request to generate a vector embedding, wherein the first machine-learned model processes the first feature and the second feature to generate the vector embedding;

processing, using a second machine-learned model, the vector embedding to generate a cluster identifier; and retrieving, from a fuzzy cache, a first result based on the cluster identifier, wherein the fuzzy cache includes a plurality of cluster identifiers associated with a plurality of clusters, wherein the first result is associated with queries that are similar to the request, wherein probabilistic data structures are used to determine the queries that are similar to the request, and wherein the fuzzy cache serves the first result when an original data store is unavailable.

* * * * *